(12) United States Patent
Chou

(10) Patent No.: US 6,778,553 B1
(45) Date of Patent: Aug. 17, 2004

(54) SYSTEM AND METHOD FOR MEDIA STREAMING

(75) Inventor: Philip A. Chou, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 865 days.

(21) Appl. No.: 09/710,688

(22) Filed: Nov. 10, 2000

(51) Int. Cl.$^7$ ............................................. H04J 3/16
(52) U.S. Cl. ..................... 370/465; 370/477; 709/231
(58) Field of Search ................................ 370/473, 474, 370/477, 465, 468, 299, 230, 235, 390, 236, 238; 348/388.1; 709/231, 232

(56) References Cited

U.S. PATENT DOCUMENTS

| | | | | |
|---|---|---|---|---|
| 6,148,005 | A | * 11/2000 | Paul et al. | 370/469 |
| 6,215,766 | B1 | * 4/2001 | Ammar et al. | 370/229 |
| 6,233,017 | B1 | * 5/2001 | Chaddha | 375/240.12 |
| 6,253,241 | B1 | * 6/2001 | Chaddha | 709/223 |
| 6,564,262 | B1 | * 5/2003 | Chaddha | 709/231 |
| 6,590,902 | B1 | * 7/2003 | Suzuki et al. | 370/465 |
| 6,594,798 | B1 | * 7/2003 | Chou et al. | 714/820 |
| 6,728,775 | B1 | * 4/2004 | Chaddha | 709/231 |

OTHER PUBLICATIONS

P. Chou, A. Mohr, A. Wang and S. Mehrotra. "FEC and Pseudo–ARQ for Receiver–driven Layered Multicast of Audio and Video". *IEEE Data Compression Conference*, Snowbird, UT, pp. 440–449, Mar. 2000.

P. Chou, T. Lookabaugh and Robert M. Gray, "Optimal Pruning with Applications to Tree–Structured Source Coding and Modeling", IEEE Transactions on Information Theory, vol. 35, No. 2, Mar. 1989, pp. 299–315.

V. Chande and N. Farvardin, Progressive Transmission of Images Over Memoryless Noisy Channels, *IEEE Selected Areas in Communications*, vol. 18, No. 6, pp. 850–860, Jun. 2000.

J. Lu and A. Nosratinia and B. Aazhang, "Progressive Source–Channel Coding of Images Over Bursty Channels," *IEE Intl. Conference on Image Processing*, Chicago, IL, Oct. 1998.

M.J. Ruf and J.W. Modestino, "Operational Rate–Distortion Performance for Joint source and Channel Coding of Images", *IEEE Transactions of Image Processing*, vol. 8, No. 8, pp. 305–320, Mar. 1999.

A. Ortega and K. Ramchandran, "Rate–Distortion Methods for Image and Video Compression", IEEE Signal Processing Magazine, vol. 15, No. 6, pp. 23–50, Nov. 1998.

Co–pending U.S. patent application Ser. No. 09/316,869, "Receiver–Driven Layered Error Correction Multicast Over Heterogeneous Packet Networks", filed May 21, 1999.

* cited by examiner

*Primary Examiner*—Min Jung
(74) *Attorney, Agent, or Firm*—Lyon & Harr, LLP; Katrina A. Lyon

(57) ABSTRACT

A system and process according to the present invention involves tagging prescribed portions of the data of each layer in a layered multicast or layered presentation with an indicator of the importance or utility that the data provides to the receiver. Additionally, the data is tagged with a cost factor involved with sending the data. The aforementioned portions of the data can be an entire data stream of a layer, or some part thereof all the way down to the individual packets making up the stream. The invention also involves determining the optimized scenario for sending the data from the sender to the receiver based on the data tags.

24 Claims, 4 Drawing Sheets

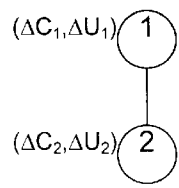 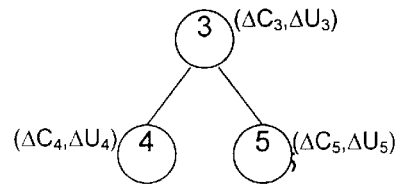 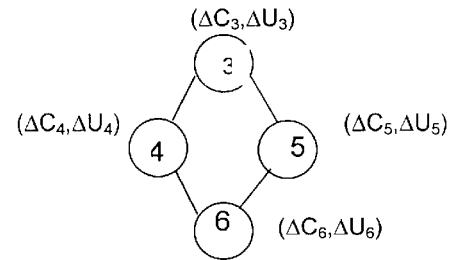
FIG. 3A  FIG. 3B  FIG. 3C
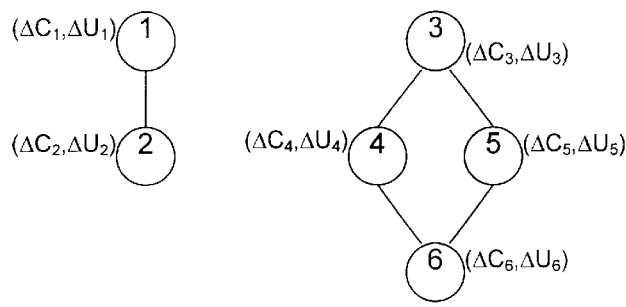
FIG. 4

SYSTEM AND METHOD FOR MEDIA STREAMING

BACKGROUND OF THE INVENTION

1. Technical Field

The invention is related to the real-time transmission of media data from a sender to a receiver over a packet-based network.

2. Background Art

Real-time media, such as radio and television programs, are broadcast from a single sender to multiple, geographically distributed receivers, who have all "tuned" to that sender. Commonly, the signals are broadcast from the sender by a terrestrial antenna, but satellite and wired solutions also exist. For example, in cable TV, the signals are broadcast from a sender by propagating a voltage along a coaxial cable to receivers connected to the cable.

It is also possible to use the Internet infrastructure to broadcast audio and video information. This can be accomplished using the Internet Protocol (IP) Multicast mechanism and its associated protocols. An Internet broadcast (or more properly, "multicast") is provided to the set of receivers who have first "subscribed" to the information. Specifically, through an announcement mechanism, such as a web page, a broadcaster announces the IP multicast group address to which it will send a particular broadcast. The multicast group address is just a special case of an ordinary IP address. However, unlike an ordinary address which is used to identify the "location" of a receiver where data is to be sent, a multicast group address is used by routers in the network to identify data being transmitted on the network as part of the broadcast, so that it can be routed to a subscribing receiver (who will have a completely different address). The receiver's address is not included in the broadcasted information. A receiver subscribes to the broadcast by notifying the network that it wishes to "join" the multicast group. The subscriptions cause various routers in the network to update their states, to ensure that the multicast information eventually reaches the subscribers. At some point the sender begins to send packets to the specified address. When a router receives a packet with that address, it sends copies of the packet through each outgoing interface that leads to a subscriber. This causes the packets to reach the subscribers at some point, albeit with the inevitable packet loss due to network congestion and buffer overflow.

Alternately, the audio and video information could be sent directly to a receiver using its Internet address. This form of audio and video data transfer would more accurately be referred to as a real-time unicast multimedia presentation, rather than a real-time broadcast or multicast multimedia presentation.

When data is transferred over a network, and particularly over the Internet, the channels between the sender and each receiver can vary dramatically in capacity, often by two or three orders of magnitude. These differences in capacity exist because the data transmission rates associated with the connections to a particular receiver can vary (e.g., phone line capacity, LAN and/or modem speeds). This heterogeneity in capacity can cause problems in the context of a unicast or multicast presentation of real-time audio and video information. For example, a particular receiver may not have the bandwidth available to receive the highest quality transmission that a sender is capable of providing. One early attempt to cope with this problem involved simulcasting or transmitting the audio and video data at different transmission rates to different receivers, with the quality being progressively better in the data transmitted at the higher rates. The receiver then received the transmission that suited its capability. However, this solution was very storage or bandwidth intensive as much of the same information had to be repeated for each transmission rate. To overcome this problem, audio and video information can be transmitted via a layered unicast or multicast presentation.

In a layered unicast or multicast presentation, audio and video information is encoded in layers of importance. Each of these layers is transmitted in a separate data stream, which are in essence a sequence of packets. The base layer is an information stream that contains the minimal amount of information, for the least acceptable quality. Subsequent layers enhance the previous layers, but do not repeat the data contained in a lower layer. In order to obtain the higher quality, a receiver must receive the lower layers in addition to the higher layers that provide the desired quality. Thus, the layers are hierarchical in that there is at least one base layer (typically one audio base stream and one video base stream), and one or more additional higher level layers. There can in fact be several hierarchical layers building up from a base layer with each subsequent layer being dependent on the data of one or more lower level layers and enhancing those lower level layers. In particular, it is possible to have two or more enhancement layers depending on the same lower level layer, but not depending on each other. Each of the layers would enhance the lower level layers on which they depend in a different way. For example, a stream in one higher-level layer might include data that enhances the frame rate of a foreground object in a preceding lower-level layer, while a separate higher-level layer might increase the resolution of a background object in this lower-level layer. A receiver may use either such enhancement layer without the other, or may use both such enhancement layers. However, a receiver may only use an enhancement layer if it also receives all of the layers on which it depends either directly or indirectly.

In addition, there can also be one or more error correction layers associated with each base and enhancement layer in the unicast or multicast presentation. For example, such a layered error correction technique was described in a co-pending U.S. patent application entitled "RECEIVER-DRIVEN LAYERED ERROR CORRECTION MULTICAST OVER HETEROGENEOUS PACKET NETWORKS", which was filed on May 21, 1999, and assigned Ser. No. 09/316,869.

In a layered unicast or multicast presentation scheme, a receiver can subscribe to as many layers as it wants, provided the total bandwidth of the layers is not greater than the bandwidth of the most constrained link in the network between the sender and the receiver. For example, if the receiver is connected to the Internet by a 28.8 Kbps modem, then it can feasibly subscribe to one, two, or three 8 Kbps video layers. If it subscribes to more than three layers, then congestion will certainly result and many packets will be dropped randomly, resulting in poor video quality. Given this, a question arises as to which ones of the available layers should be transmitted to a receiver in view of the existing bandwidth constraint.

If the dependence between layers is sequential, for example, if a second layer depends on a first layer, a third layer depends on the second layer, and so on, then it is a simple matter to decide which layers to transmit: transmit the layers in order up to the bandwidth constraint. This maximizes quality subject to the bandwidth constraint. However, in many situations the dependence between layers is not sequential. For example, suppose both the second and third layers depend directly on the first layer, but not on each other. In this case there may be multiple sets of layers that can satisfy a given bandwidth constraint. Thus, the question arises as to which set of layers should be transmitted to a receiver.

SUMMARY

The present invention is directed at resolving the issue of determining which ones of the available data layers should be transmitted to a receiver in view of a bandwidth constraint and in view of the dependences between them. In its most general terms the system and process according to the present invention involves tagging prescribed portions of the data of each layer in a layered unicast or layered multicast presentation with an indicator of the importance or utility that the data provides to the receiver, and with an indicator of its bandwidth or cost of the data. Together with a graph of the dependences between layers, these indicators can be used to select the set of layers that should be transmitted to the receiver to maximize utility and minimize cost. The aforementioned portions of the data can be an entire data stream of a layer, or some part thereof all the way down to the individual packets making up the stream.

The importance or utility associated with the tagged data refers to its benefit to the receiver. For example, the utility could be couched in terms of how much the quality is increased, or the distortion is decreased, or the resolution is improved by the addition of the tagged data. The cost associated with the tagged data refers to the cost to transmit it. For example, the cost could be couched in terms of the bandwidth of the tagged data if it is a stream, or the size in bits of the tagged data if it is a packet. For the purposes of the description that is to follow, the tagged data will be assumed to be a single packet.

Once the packet of each layer has been tagged with indicators of its contributions to the overall utility that can be realized and the overall cost that can be incurred should the packet be transmitted, all that is left to do is to determine which combination of layers provides the greatest overall utility within the overall cost constraint associated with the time period it will take to transmit the selected combination of layers. It is noted that the utility and cost contribution indicators associated with the packets that are to be transmitted concurrently are additive. Thus, the overall utility of a set of packets being considered for transmission is simply the sum of the utility contribution indicators associated with the packets, and the overall cost is simply the sum of the individual costs associated with the packets. Of course, when considering which layers to include in the transmission it must be remembered that some layers are dependent on other layers. Thus, in order to select a particular layer for transmission, packets from all of the layers in the chain of layers that the selected layer is dependent on back to the base layer must be transmitted as well, and so considered in the process of determining the combination of packets that maximize the overall utility, while not exceeding the overall cost of the transmission.

In regard to the aforementioned analysis, several different methods could be employed. In order to better understand each of these methods, the previously described hierarchical layer structure and the dependencies between the layers can be represented graphically using a directed acyclic graph (DAG) whose nodes represent the available layers (and particularly the aforementioned packet thereof and whose links represent the dependencies between the layers. In particular, a link directed from one layer to a second layer represents the direct dependence of the second layer on the first layer. In this case, the first layer is said to be the parent of the second layer, and /the second layer is said to be the child of the first layer. A layer may have zero or more children. A layer may also have zero or more parents. A layer with zero parents is said to be a base layer. Otherwise it is said to be an enhancement layer. There must be at least one base layer, but in general there may be more than one base layer. A layer with zero children is said to be a leaf layer. A DAG with one base layer and one leaf layer, in which every layer has at most one parent and at most one child, is said to be sequential. A DAG in which every layer has at most one parent (but may have more than one child) is said to be a tree. Hence a tree is a type of DAG and a sequential DAG is a type of tree. A DAG in which some layer has two or more parents is said to be a multi-dependence DAG. If one layer is an ancestor of a second layer (that is, is its parent, its parent's parent, or so on), then the first layer is said to be at a higher level than the second layer, and the second layer is said to be at a lower level than the first layer. The foregoing DAG representation of a layered unicast or multicast presentation scheme will be employed in the description of the present invention that is to follow.

In simple cases where there are relatively few nodes to consider, it is possible to simply enumerate all the possible legal combinations of these nodes, and then evaluate each one, choosing the combination having the highest total summed utility among those whose total summed cost is below the cost constraint (such as the anticipated maximum available bandwidth). It is noted that a legal combination is defined as one in which a node is included only if all of its ancestors are also included in the combination.

Taking into account the probability that the data associated with each node arrives at the receiver improves the decision as to which packets to send. The probability is factored into the analysis by computing an expected total utility associated with a candidate combination. In general, this entails identifying all the possible results of sending a candidate combination of packets and computing the probability of each result occurring. Based on the anticipated packet loss rate of the network and the amount of error correction data transmitted, the probability of each of the outcomes can be computed via conventional methods. It is noted that there is a total utility associated with each possible outcome. The total expected utility associated with the candidate combination is then computed by multiplying the total utility associated with each possible outcome by the probability that that outcome will occur, and then summing the products of this calculation.

Many different transmission options are possible, each of which can apply to each of the layers involved in the combination. For example, in addition to being transmitted or not, if a packet is transmitted it can be transmitted immediately or with any prescribed delay. Further, the packet could be transmitted with low or high priority using the network's quality-of-service mechanism, if any, or with high or low loss protection using an error correction mechanism such as described in the aforementioned co-pending application. In fact these are just a few of the many possible transmission options that are sometimes employed. Each of these transmission options will have a unique utility contribution and transmission cost, as well as a different probability of arriving at the receiver on time. Thus, it would be advantageous to consider the various transmission options for each packet in a candidate combination when determining which combination provides the highest total expected utility within the cost constraint. This is accomplished by not just considering all the possible combinations of packets, but considering all the combinations of packets at each of the various prescribed transmission options.

A process of enumerating all the possible combinations, computing the total expected utility for each, and then selecting the combination having the highest expected utility that does not exceed the anticipated cost constraint, could be employed to optimize the transmission.

Alternately, this problem can be solved by the use of a novel process that can determine the optimum combination for any cost constraint, no matter what form the DAG of the layered scheme takes, whether arrival probability is considered, or whether multiple transmission options exist.

The process involves characterizing the foregoing factors as follows: Find the transmission option $\pi_n$ for each node n in the graph $G_{max}$, which represents the set of all packets that could be transmitted in a given timeframe, such that the expected utility is maximized subject to a cost constraint. The expected utility is the sum over all packets n of the expected increase $E[\Delta U_n \Pi_{n<=n} I_{n'}]$, where the product is over all packets n' on which packet n depends (including itself) (the notation n'<=n means that n' is an ancestor of n in the dependency graph or is equal to n, and $I_{n'}$ is a random variable equal to 1 if packet n' arrives on time at its destination and is equal to 0 otherwise. If the packets are transmitted independently, then the expected utility equals $\Sigma_n \Delta U_n \Pi_{n'<=n}(1-\epsilon(\pi_n))$. Likewise, the cost is the sum over all packets n of $\Delta C_n$ times the transmission option cost $\rho(\pi_n)$, or $\Sigma_n \Delta C_n \rho(\pi_n)$. Thus, the problem is to find the transmission option $\pi_n$ for each node to maximize $\Sigma_n \Delta U_n \Pi_{n'<=n}(1-\epsilon(\pi_n))$ subject to a constraint on $\Sigma_n \Delta C_n \rho(\pi_n)$. Notice that this generalizes the original problem, in which there are only two transmission options: $\pi_n=0$ (don't transmit) or $\pi_n=1$ (transmit), for which $\epsilon(0)=1$, $\epsilon(1)=0$, $\rho(0)=0$, and $\rho(1)=1$. This being said, the process can be described as follows. To describe the algorithm, let $\pi=(\pi_1, \ldots, \pi_N)$ be the vector of transmission options, where N is the number of nodes in the graph. It is sought to maximize the expected utility $U(\pi)=\Sigma_n \Delta U_n \Pi_{n'<=n}(1-\epsilon(\pi_n))$, subject to a constraint on the cost $C(\pi)=\Sigma_n \Delta C_n \rho(\pi_n)$. Consider the set of points in the Cost-Utility plane, $\{(C(\pi),U(\pi))\}$, where the vector $\pi$ takes on all possible combinations of values. It is sought to find those points $(C(\pi^*),U(\pi^*))$ such that $U(\pi^*)>=U(\pi)$ for all points $(C(\pi),U(\pi))$ with $C(\pi)<=C(\pi^*)$. Certainly this is satisfied by points $(C(\pi^*),U(\pi^*))$ on the upper convex hull of the set $\{(C(\pi),U(\pi))\}$. For each point $(C(\pi^*),U(\pi^*))$ on this upper convex hull, there exists a Lagrange multiplier $\lambda>0$ such that $J_\lambda(\pi^*)>=J_\lambda(\pi)$ for all $\pi$, where $J_\lambda(\pi)=U(\pi)-\lambda C(\pi)$. Conversely, for each Lagrange multiplier $\lambda>0$, the point $(C(\pi^*),U(\pi^*))$ satisfying $J_\lambda(\pi^*)>=J_\lambda(\pi)$ for all $\pi$ lies on the upper convex hull. Thus, by restricting the problem to this upper convex hull, the original problem can be solved, by finding the $\pi$ maximizing the Lagrangian $J_\lambda(\pi)=U(\pi)-\lambda C(\pi)=\Sigma_n[\Delta U_n \Pi_{n'<=n}(1-\epsilon(\pi_{n'}))-\lambda \Delta C_n \rho(\pi_n)]$.

The approach to solving this problem is based on the method of alternating variables for multivariate minimization. The objective function $J_\lambda(\pi_1, \ldots, \pi_N)$ is maximized one variable at a time, keeping the other variables constant, until convergence. To be precise, let $\pi^{(0)}$ be any initial vector of transmission options and let $\pi^{(t)}=(\pi_1^{(t)}, \ldots, \pi_N^{(t)})$ be determined for t=1,2, \ldots, as follows. Select one component $n^{(t)}$ in $\{1, \ldots, N\}$ to optimize at step t. This can be done round-robin style, e.g., $n^{(t)}=t \bmod N$.

Then for $n \neq n^{(t)}$ let $\pi_n^{(t)}=\pi_n^{(t-1)}$, while for $n=n^{(t)}$, let $$\pi_n^{(t)} = \mathrm{argmax}_\pi J_\lambda(\pi_1^{(t)}, \ldots, \pi_{n-1}^{(t)}, \pi, \pi_{n+1}^{(t)}, \ldots, \pi_N^{(t)})$$
$$= \mathrm{argmin}_\pi S_n^{(t)} \epsilon(\pi) + \lambda \Delta C_n \rho(\pi)$$
$$= \mathrm{argmin}_\pi \epsilon(\pi) + \lambda' \rho(\pi),$$

where $S_n^{(t)}=\Sigma_{n'>=n} \Delta U_n \Pi_{n''<=n', n''\neq n}(1-\epsilon(\pi_{n''}^{(t)}))$, and $\lambda'=\lambda \Delta C_n / S_n^{(t)}$.

The minimization $\epsilon(\pi)+\lambda' \rho(\pi)$ over an individual transmission option $\pi$ can be performed by a conventional exhaustive search technique or by some other method.

DESCRIPTION OF THE DRAWINGS

The specific features, aspects, and advantages of the present invention will become better understood with regard to the following description, appended claims and accompanying drawings where:

FIG. 3A depicts a simple sequential directed acyclic graph whose nodes represent available data layers or packets thereof and whose links represent the dependencies between the layers.

FIG. 3B depicts a tree directed acyclic graph where a layer may have more than one child.

FIG. 3C depicts a multi-dependence directed acyclic graph where a layer may have more than one parent.

FIG. 4 depicts a directed acyclic graph where the audio component is portrayed as a simple sequential directed acyclic subgraph on the left and where the video component is portrayed as a multi-dependent directed acyclic subgraph.

DETAILED DESCRIPTION OF THE PREFERRED EMBODIMENTS

In the following description of the preferred embodiments of the present invention, reference is made to the accompanying drawings, which form a part hereof, and which is shown by way of illustration of specific embodiments in which the invention may be practiced. It is understood that other embodiments may be utilized and structural changes may be made without departing from the scope of the present invention.

Figure 1:
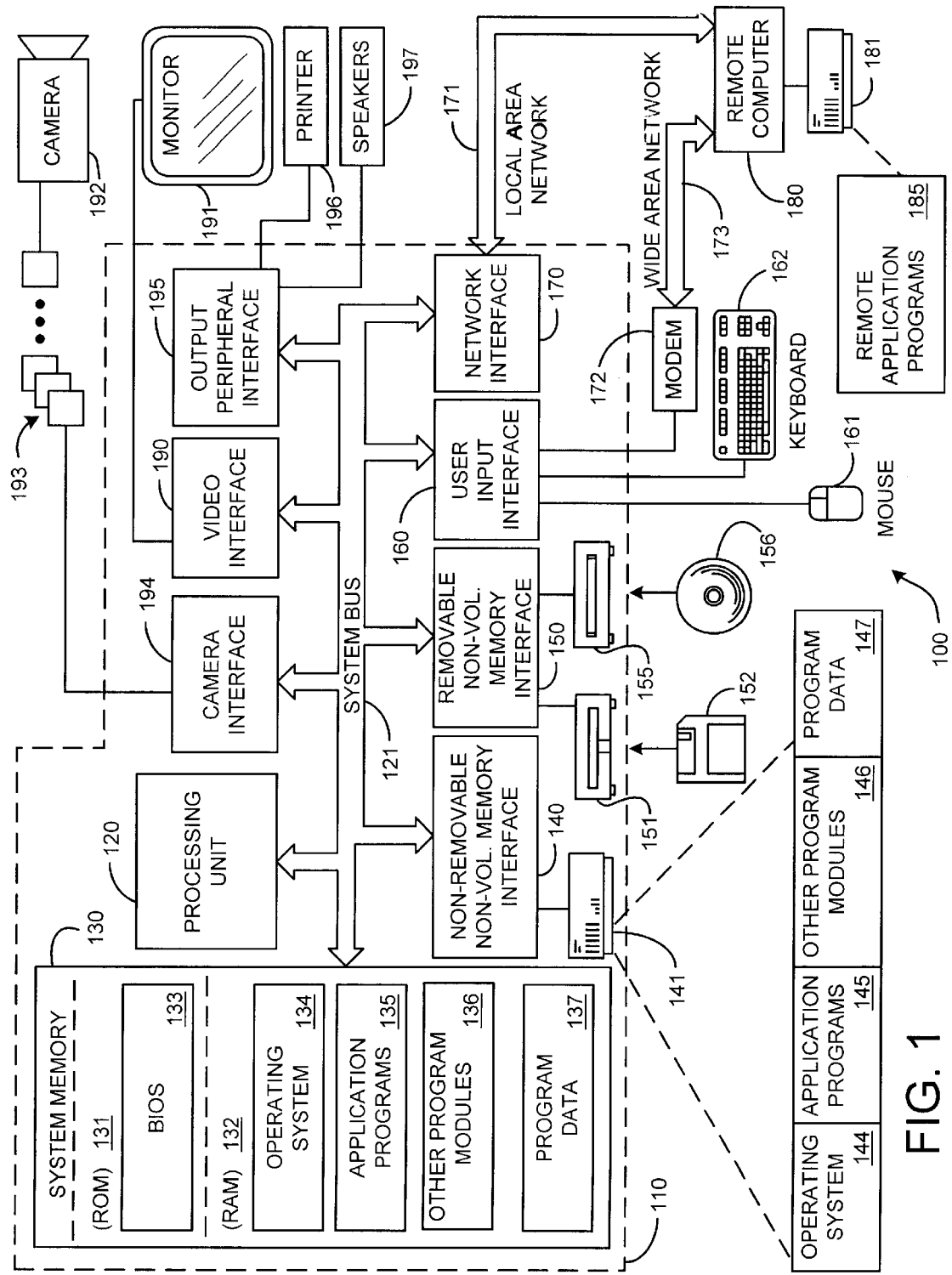
FIG. 1 is a diagram depicting a general purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

Figure 2:
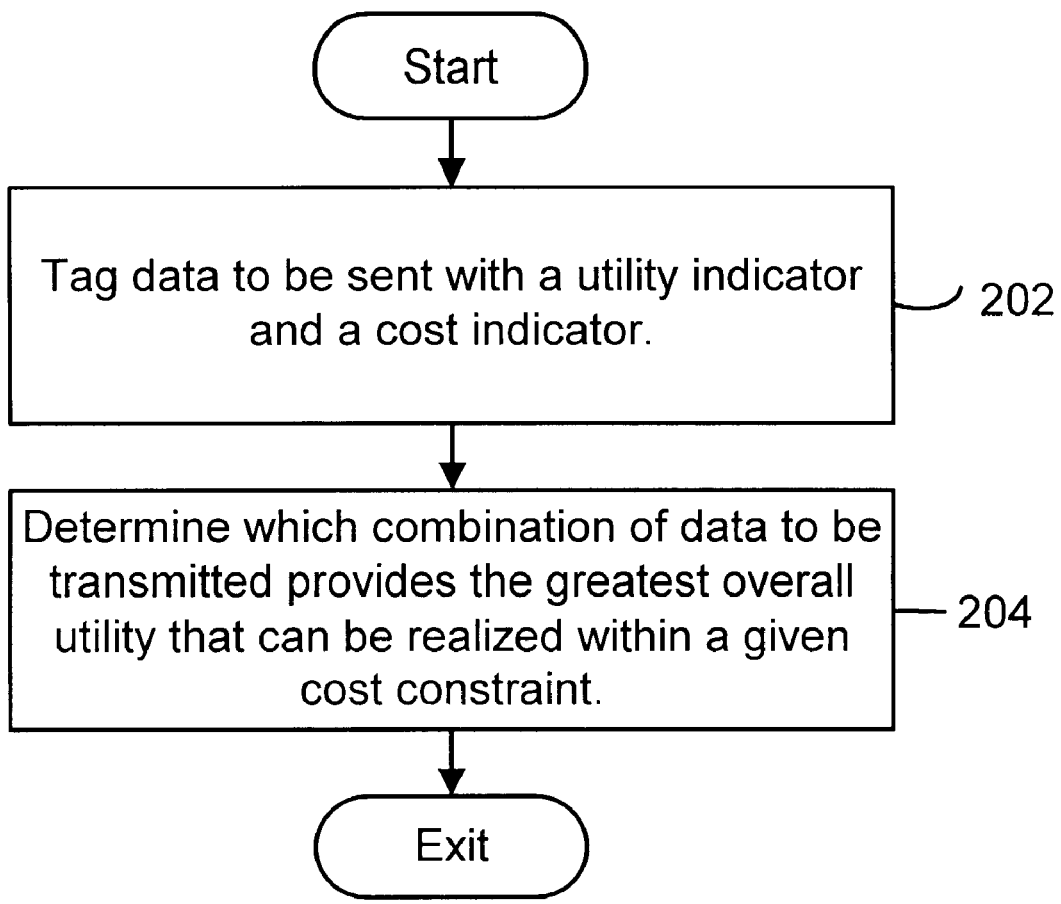
FIG. 2 is an overview flow diagram of the system and method according to the present invention.

As shown in FIG. 2, in its most general terms the system and process according to the present invention involves tagging prescribed portions of the data to be sent from a sender to a receiver in a layered multicast or presentation with a cost of transmission and a measure of the benefit or utility afforded the receiver by its receipt (process action 202). Then the combination of the prescribed data portions to be transmitted that provides the greatest overall utility that can be realized within a given cost constraint is determined (process action 204). The aforementioned portions of the data can be an entire data stream of a layer in the layered unicast or multicast presentation, or some part thereof all the way down to the individual packets making up the stream. Essentially, the size of the prescribed portion of the data should reflect the degree to which it is anticipated that the available bandwidth may change. For example in an ideal network the available bandwidth never changes. In such a case the entire data streams associated with a layer could be employed as the prescribed portion of the data. However, in a real network environment, the available bandwidth will fluctuate. Thus, if the analysis as to which layers are to be transmitted was optimized for an assumed available bandwidth and the actual bandwidth falls below the assumed level, some of the transmitted data will be lost (over and above the amount inherently lost when transmitting over a network like the Internet). As such the amount of data in each prescribed portion of each layer that is assigned a utility indicator should preferably be no bigger than the amount of data that can be sent between the fluctuations in the available bandwidth. Realistically, in a network like the Internet this will likely amount to no more than a single packet being the size of the prescribed portion. Therefore, for the purposes of the description that is to follow, the portion of the layers under consideration will be assumed to be a single packet. However, it is not intended that the invention be so limited. Thus, anytime a packet is referred to it should be understood that this could also be multiple packets, or even the entire data stream.

The importance or utility associated with the tagged data refers to its benefit to the receiver. For example, the utility could be couched in terms of how much the resolution is improved by the addition of the tagged data. Once the packet of each layer has been tagged with an indicator of its contribution to the overall utility that can be realized should the data in all the layers be transmitted, all that is left to do is to determine which combination of layers provides the greatest total utility within the anticipated bandwidth constraints associated with the time period it will take to transmit the selected combination of layers (see process action 204 of FIG. 2). To accomplish this task the size (e.g., number of bits) of each packet of each layer must be known as well. This size will be referred to as the cost associated with transmitting the packet of the layer. Thus, each of the packets will have an indicator of its contribution to the overall utility as well as a transmission cost associated with it. It is noted that the utility contribution indicators and costs associated with the packets that are to be transmitted concurrently are additive. Thus, the overall utility of a set of packets being considered for transmission is simply the sum of the utility contribution indicators associated with the packets, and the overall cost is simply the sum of the individual costs associated with the packets. Of course, when considering which layers to include in the transmission it must be remembered that some layers are dependent of other layers. Thus, in order to select a particular layer for transmission, packets from all its ancestral layers back to the base layer must be transmitted as well, and so considered in the process of determining the combination of packets that maximize the total utility, while not exceeding the overall anticipated bandwidth available during the transmission.

In regard to the aforementioned analysis, several different methods could be employed. In order to better understand each of these methods, the previously described hierarchical layer structure and the dependencies between the layers can be represented graphically using a directed acyclic graph (DAG) whose nodes represent the available layers (and particularly the aforementioned packet thereof) and whose links represent the dependencies between the layers. If there is a layer on which a second layer depends, then the first layer is said to be the parent of the second layer, and the second a child of the first. Referring to FIGS. 3A–C, generalized examples of DAGs for various types of hierarchical structures are shown. FIG. 3A is an example of a simple sequential DAG having at most one parent and at most one child for each layer. FIG. 3B is an example of a DAG tree having at most one parent but possibly more than one child for each layer. For example, in the scenario described above where separate foreground and background enhancing data streams were associated with the same level of the hierarchy, and assuming there is no other even higher level layer containing data to enhance both of these same-level layers, a DAG tree is formed with both the foreground and background enhancing layers being dependent on the base layer. Finally, FIG. 3C depicts a multi-dependent DAG having more than one parent and possibly more than one child for some layers. For example, in the scenario described above with the background and foreground enhancing layers occupying the same layer of the hierarchy, assume an even higher level layer contains data that enhances both of the previously enhanced foreground and background portions of the multicast or presentation. Accordingly, this higher-level layer would depend on both the foreground and background enhancing streams in the layer above. The foregoing DAG representation of a layered multicast or presentation scheme will be employed in the description of the present invention that is to follow.

The problem is to find the pruned subgraph of the DAG with highest utility for the given cost constraint. A "pruned" subgraph G of a graph $G_{max}$ is a subgraph of $G_{max}$ such that if a node is in the subgraph G, its predecessors in $G_{max}$ are also its predecessors in G. In other words, the problem is to find a set of streams with highest utility for the given cost, such that if a stream is in the set, then all of the streams on which it depends are also in the set. The utility for a set of streams is the sum of utilities of the streams in the set, and likewise for the cost of a set.

In simple cases where there are relatively few nodes to consider, it is possible to simply enumerate all the possible legal combinations of the nodes, and then evaluate each one, choosing the combination having the highest total summed utility among those whose total summed cost is below the anticipated maximum available bandwidth (hereinafter referred to as the cost constraint). It is noted that a legal combination is defined as one in which a node is included only if all of its ancestor nodes back to the base layer are also included in the combination.

While the foregoing solution to the problem of identifying the optimal combination of nodes for transmission will always work, it can become impractical from a processing standpoint if the number of nodes is large. Given that a multicast or presentation can include a base and several enhancement layers, as well as multiple error correction layers for each of the base and enhancement layers, it can be seen that the number of nodes to consider can easily become too large to handle via the full enumeration method. In such cases, other methods are preferably employed to find the optimal combination. For example, in cases where the packets of the various layers that are to be transmitted concurrently, and there dependencies, would be represented by a DAG forming a simple sequence or tree, the set of these layer packets that would provide the maximum utility (e.g., highest resolution) for the given maximum cost (e.g., the anticipated maximum available bandwidth) can be found using the dynamic programming technique described in P. A. Chou, T. Lookabaugh, and R. M. Gray, "Optimal pruning with applications to tree-structured source coding and modeling," *IEEE Transactions on Information Theory*, Vol. 35, No. 2, pp. 299–315, March 1989.

While the aforementioned "optimal pruning" technique is useful for determining the optimum transmission combination for layered multicasts or presentations represented by a DAG forming a simple sequence or tree, it will not work in the previously-described case where the packets transmitted concurrently include packets having multiple dependencies (i.e., dependent from more than one lower level node). Another process must be employed for this latter scenario. A novel process for accomplishing this task as will be described below.

The "optimal pruning" technique will also not work in cases where the multicast or presentation includes two base layers. A typical example of a two base layer scheme is the transmission of separate data streams for audio and video. In such a scenario, there is a separate audio layer, which may have one or more audio enhancement layers depending from it. There is also a separate video base layer, which also may have one or more video enhancement layers depending from it. A DAG of this two base layer scheme would show a separate node and link pattern for each of the audio and video components of the multicast or presentation. Further, the individual audio and video patterns could be simple sequences, trees, or patterns with multi-dependent nodes. FIG. 4 provides an example of such a two-base system where the audio pattern on the left is a simple sequence and the video pattern of the right has a multi-dependent node at the bottom. As the transmission of multicasts and presentations characterized by two separate base layers cannot be optimized using the aforementioned "optimal pruning" technique, another process must be employed for this scenario as well. The novel process mentioned above is also capable of accomplishing the optimization of a two base-layer scheme.

Figure 5:
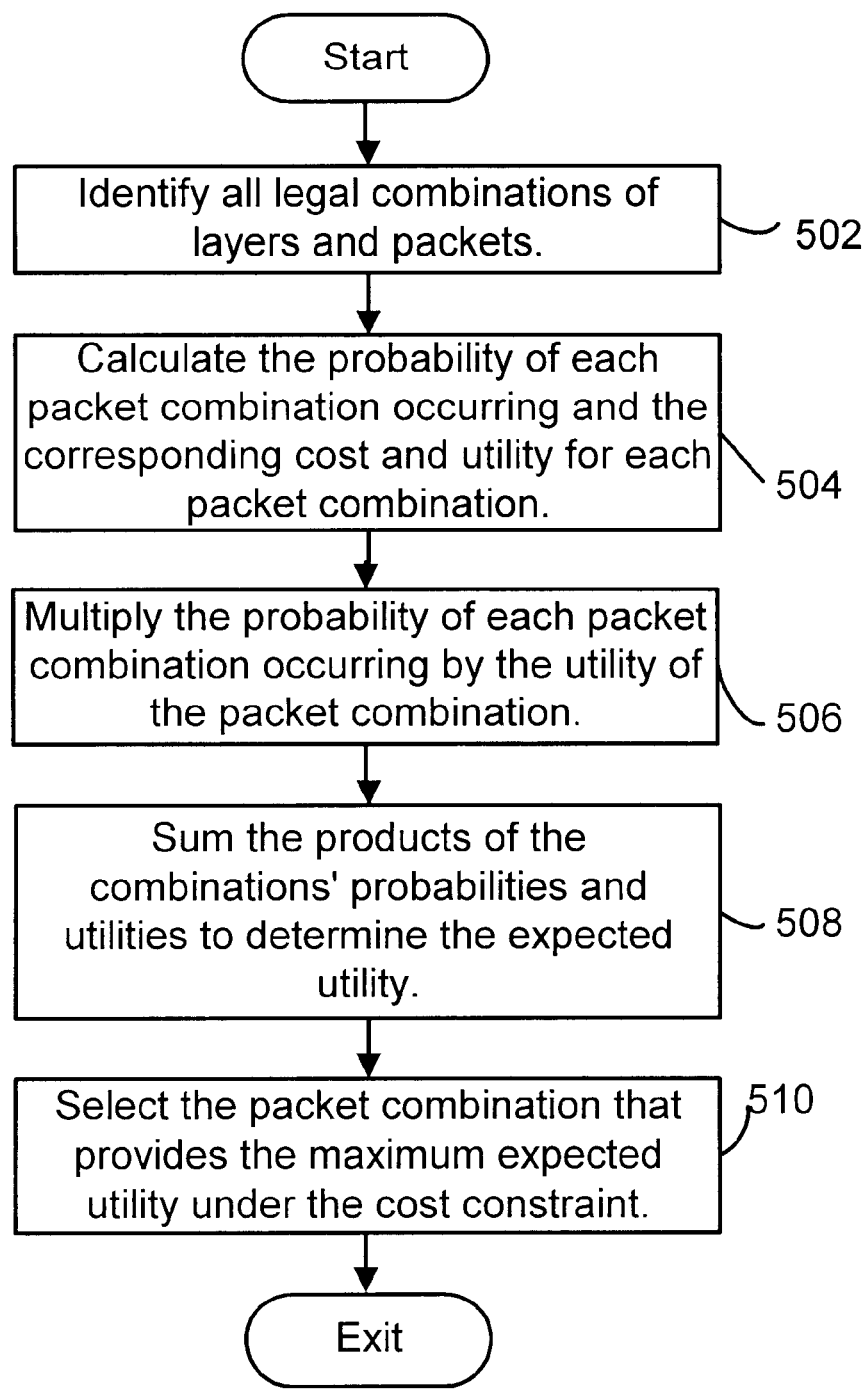
FIG. 5 depicts a flow chart of the system and method according to the present invention wherein the probability that data may be lost in transmission is taken in account.

The foregoing description is somewhat simplistic since it assumes that all data associated with each packet or node reaches the receiver. This is not improbable especially if some of the layers transmitted are error correction layers such as described in the aforementioned co-pending application. However, the utility optimization process would be more versatile if the probability of data associated with each node actually arriving at the receiver, or at least arriving on time (i.e., before it is needed for playback), is taken into account. This is important since the actual increase in utility is dependent on what is received not what is sent. For example, suppose the data associated with a base node did not arrive at the receiver, but enhancing data associated with higher level nodes which are dependent on the base layer are received. In such a case the enhancement data is useless and any increase in utility associated with the enhancement data is not realized. Thus, taking into account the probability of the data associated with each node arriving at the receiver will improve the decision as to which packets to send. The probability is factored into the analysis by computing an expected total utility associated with a candidate combination. In general, as shown in FIG. 5, this entails identifying all the possible results of sending a candidate combination of packets (process action 502) and computing the probability of each result occurring (process action 504). For example, take the case of a simple two layer audio multicast or presentation having a base layer and one enhancement layer. Further assume that the candidate combination under consideration includes a packet from both the layers. The possible outcomes of transmitting the data is that neither will arrive on time, that both will arrive on time, that only the data associated with the base layer will arrive on time, and that only the data associated with the enhancement layer will arrive on time. Based on the anticipated packet loss rate of the network and the amount of error correction data transmitted, the probability of each of the foregoing outcomes can be computed via conventional methods. It is noted that there is a total utility associated with each possible outcome. In the foregoing example, the total summed utility of the first outcome is zero as none of the data would be received, whereas in the second outcome, the total utility is the sum of the utility contributions associated with each of the packets as both arrived intact. As for the case where just the base layer data arrives on time, the total utility is the contribution associated with the base layer packet. And finally, in the last possible outcome the total utility is zero even though the enhancement layer data arrived on time because this data is useless without the base layer data. As shown in process action 506, the total expected utility associated with the candidate combination is then computed by multiplying the total utility associated with each possible outcome by the probability that that outcome will occur, and then summing the products of this calculation (process action 508). The packet combination then selected for transmission is the one that provides the maximum expected utility under the cost constraint (process action 510).

The prior description is also simplistic in that it assumes only two transmission options, namely transmitted or not. However, many different transmission option are possible, each of which can apply to each of the layers involved in the combination. For example, in addition to being transmitted or not, if a packet is transmitted it can be transmitted immediately or with any prescribed delay. Further, the packet could be transmitted with low or high priority, and high or low loss protection. In fact these are just a few of the many possible transmission options that are sometimes employed. Each of these transmission options will have a unique utility contribution and transmission cost, as well as a different probability of arriving at the receiver on time. Thus, it would be advantageous to consider the various transmission options for each packet in a candidate combination when determining which combination provides the highest total expected utility within the cost constraint. This is accomplished by not just considering all the possible combinations of packets, but considering all the combinations of packets at each of the various prescribed transmission options. Thus for example, a candidate combination of the exemplary two-layer audio multicast or presentation described earlier would not just be the base layer packet and the enhancement layer packet, but a base layer packet as it exists using a particular transmission option, and an enhancement layer packet as it exists using a particular transmission option (which can be the same or different from the option associated with the base layer packet).

Theoretically, a process of enumerating all the possible combinations, computing the total expected utility for each, and then selecting the combination having the highest expected utility that does not exceed the anticipated cost constraint, could be employed to optimize the transmission. However, as can be imagined, as the number of layers and transmission options increases, the number of candidate combinations increases, and so the number of possible transmission outcome increases. Thus, the enumeration technique could prove to be too processing intensive to be practical. In view of this, shortcut techniques are desirable. Some such shortcut techniques that could be used to find the optimum combination for layered multicasts or presentation representable as a simple sequence DAG are approximated in M. J. Ruf and J. W. Modestino, "Operational rate-distortion performance for joint source and channel coding of images," IEEE Transactions on Image Processing, Vol. 8, No. 8, pp. 305–320, March 1999.

and in

J. Lu and A. Nosratinia and B. Aazhang, "Progressive source-channel coding of images over bursty channels," IEEE Int'l Conf. on Image Processing, Chicago, Ill., October 1998.

and has been solved exactly using dynamic programming in

V. Chande and N. Farvardin, "Progressive transmission of images over memoryless noisy channels," IEEE J. Selected Areas in Communications, Vol. 18, No. 6, pp. 850–860, June 2000.

However, these techniques will not work for layered schemes having DAGs in form of a tree or where multi-dependencies are a factor. These methods also may not work for layered schemes with more than one base layer, such as the audio-video multicast or presentation. However, these problems can be solved by the use of the aforementioned novel process. This process can determine the optimum combination for any cost constraint, no matter what form the DAG of the layered scheme takes, whether arrival probability is considered, or whether multiple transmission options exist.

The process involves characterizing the foregoing factors as follows: Find the transmission option $\pi_n$ for each node n in the graph $G_{max}$ such that the expected utility is maximized subject to a cost constraint. The expected utility is the sum over all packets n of the expected increase $E[\Delta U_n \Pi_{n'<=n} I_{n'}]$, where the product is over all packets n' on which packet n depends (including itself)(the notation n'<=n means that n' is an ancestor of n in the dependency graph or is equal to n, and $I_{n'}$ is a random variable equal to 1 if packet n' arrives on time at its destination and is equal to 0 otherwise. If the packets are transmitted independently, then the expected utility equals $\Sigma_n \Delta U_n \Pi_{n'<=n}(1-\epsilon(\pi_{n'}))$. Likewise, the cost is the sum over all packets n of $\Delta C_n$ times the transmission option cost $\rho(\pi_n)$, or $\Sigma_n \Delta C_n \rho(\pi_n)$. Thus, the problem is to find the transmission option $\pi_n$ for each node to maximize $\Sigma_n \Delta U_n \Pi_{n'<=n}(1-\epsilon(\pi_{n'}))$ subject to a constraint on $\Sigma_n \Delta C_n \rho(\pi_n)$. Notice that this generalizes the original problem, in which there are only two transmission options: $\pi_n=0$ (don't transmit) or $\pi_n=1$ (transmit), for which $\epsilon(0)=1$, $\epsilon(1)=0$, $\rho(0)=0$, and $\rho(1)=1$. This being said, the process can be described as follows. Let $\pi=(\pi_1, \ldots, \pi_N)$ be the vector of transmission options, where N is the number of nodes in the graph. It is sought to maximize the expected utility $U(\pi)=\Sigma_n \Delta U_n \Pi_{n'<=n}(1-\epsilon(\pi_{n'}))$, subject to a constraint on the cost $C(\pi)=\Sigma_n \Delta C_n \rho(\pi_n)$. Consider the set of points in the Cost-Utility plane, $\{(C(\pi),U(\pi))\}$, where the vector $\pi$ takes on all possible combinations of values. It is sought to find those points $(C(\pi^*),U(\pi^*))$ such that $U(\pi^*)>=U(\pi)$ for all points $(C(\pi),U(\pi))$ with $C(\pi)<=C(\pi^*)$. Certainly this is satisfied by points $(C(\pi^*),U(\pi^*))$ on the upper convex hull of the set $\{(C(\pi),U(\pi))\}$. For each point $(C(\pi^*),U(\pi^*))$ on this upper convex hull, there exists a Lagrange multiplier $\lambda>0$ such that $J_{80}(\pi^*)>=J_{80}(\pi)$ for all $\pi$, where $J_{80}(\pi)=U(\pi)-\lambda C(\pi)$. Conversely, for each Lagrange multiplier $\lambda>0$, the point $(C(\pi^*),U(\pi^*))$ satisfying $J_{80}(\pi^*)>=J_{80}(\pi)$ for all $\pi$ lies on the upper convex hull. Thus, by restricting the problem to this upper convex hull, the original problem can be solved, by finding the $\pi$ maximizing the Lagrangian $J_\lambda(\pi)=U(\pi)-\lambda C(\pi)=\Sigma_n[\Delta U_n \Pi_{n'<=n}(1-\epsilon(\pi_{n'}))-\lambda \Delta C_n \rho(\pi_n)]$.

The approach to solving this problem is based on the method of alternating variables for multivariate minimization. The objective function $J_{\lambda,(\pi_1, \ldots, \pi_N)}$ is maximized one variable at a time, keeping the other variables constant, until convergence. To be precise, let $\pi^{(0)}$ be any initial vector of transmission options and let $\pi^{(t)}=(\pi_1^{(t)}, \ldots, \pi_N^{(t)})$ be determined for t=1,2, ..., as follows. Select one component $n^{(t)}$ in $\{1, \ldots, N\}$ to optimize at step t. This can be done round-robin style, e.g., $n^{(t)}=t \bmod N$. Then for $n \neq n^{(t)}$, let $\pi_n^{(t)}=\pi_n^{(t-1)}$, while for $n=n^{(t)}$, let $$\pi_n^{(t)} = \mathrm{argmax}_{\pi_n} J_\lambda(\pi_1^{(t)}, \ldots, \pi_{n-1}^{(t)}, \pi, \pi_{n+1}^{(t)}, \ldots, \pi_N^{(t)})$$

$$= \mathrm{argmin}_{\pi_n} S_n^{(t)} \epsilon(\pi) + \lambda \Delta C_n \rho(\pi)$$

$$= \mathrm{argmin}_{\pi_n} \epsilon(\pi) + \lambda' \rho(\pi),$$

where $$S_n^{(t)} = \Sigma_{n' > = n} \Delta U_n \Pi_{n'' < = n', \, n'' \neq n}(1 - \epsilon(\pi_{n''}^{(t)})), \text{ and}$$

$$\lambda' = \lambda \Delta C_n / S_n^{(t)}.$$

The minimization $\epsilon(\pi) + \lambda' \rho(\pi)$ can be performed by a conventional exhaustive search technique or by some other method.

The following steps summarize the algorithm.

Given $\lambda$ and $(\Delta C_{n1} \Delta U_n)$ for n=1, . . . ,N.

0. Initialize:

$$\epsilon_1 = \ldots = \epsilon_N = \min_\pi \epsilon(\pi)$$

$$\rho_1 = \ldots = \rho_N = \max_\pi \epsilon(\pi)$$

$$U = \Sigma_n \Delta U_n \Pi_{n' < = n}(1 - \epsilon_{n'})$$

$$C = \Sigma_n \Delta C_n \rho_n$$

$$J^{(0)} = U - \lambda C$$

$$t = 1$$

1. $n = n^{(t)} = t \bmod N$
2. $S = \Sigma_{n' > = n} \Delta U_n \Pi_{n'' < = n', \, n'' \neq n}(1 - \epsilon_{n''})$
3. $\lambda' = \lambda \Delta C_n / S$
4. $\pi^* = \mathrm{argmin}_\pi \, \epsilon(\pi) + \lambda' \rho(\pi)$,
5. $\epsilon_n = \epsilon(\pi^*)$, $\rho_n = \rho(\pi^*)$,
6. $U = \Sigma_n \Delta U_n \Pi_{n' = n}(1 - \epsilon_{n'})$, $C = \Sigma_n \Delta C_n \rho_n$
7. $J^{(t)} = U - \lambda C$
8. If $J^{(t)} = J^{(t-1)}$, stop; else $t = t+1$ and go to Step 2.

Return $\pi_1^*, \ldots \pi_N^*$.

The system and method according to the present invention has the advantage of minimizing the processing necessary to compute the data packet combination that provides the maximum receiver utility below the cost constraint.

While the invention has been described in detail by specific reference to preferred embodiments thereof, it is understood that variations and modifications thereof may be made without departing from the true spirit and scope of the invention. For example, the system and method according to the present invention can be used with other applications as well where there is a layered structure with dependencies. Also, it should be noted that there are alternate methods of selecting the layer portions or packets that are to be transmitted that employ the utility indicators and cost indicators to the layer portions or packets. For instance, it is possible to use a bottom up, or greedy growing approach. The greedy growing approach starts with a subgraph equal to an empty set of nodes, and adds nodes to the subgraph one at a time, choosing the node to be added among those that depend directly on a node already in the subgraph, and choosing the node's transmission option as it is added, such that $\Delta U / \Delta C$ is maximized. This is equivalent to starting with all nodes in the graph assigned to "don't transmit" and then sweeping once through the graph from the root to the leaves, adjusting the transmit option in a greedy (stepwise optimal) way to maximize utility until the cost constraint is met. Another possibility of selecting the layer portions or packets that are to be transmitted is to use a top down, or greedy pruning approach. This approach starts with a subgraph equal to the entire original graph, and deletes nodes from the subgraph one at a time, choosing the node to be deleted among those that have no direct dependents in the subgraph, such that $\Delta U / \Delta C$ is minimized. This is equivalent to starting with all nodes in the graph assigned to "transmit" and then sweeping once through the graph from the leaves to the root in a greedy (stepwise optimal) way to maximize utility until the cost constraint is met.

Wherefore, having thus described the present invention, what is claimed is:

1. A computer-implemented process for transmitting layered data from a sender to a receiver over a network comprising the process actions of:

segmenting the data layers into corresponding portions;

tagging each portion of each layer of data with a utility indicator representative of the benefit afforded the receiver by the receipt of that portion;

tagging each portion of each layer of data with a cost indicator representative of cost to transmit the portion from the sender to the receiver;

for each set of corresponding data layer portions, using the utility and cost indicators to determine which combination of the layer portions to transmit; and transmitting the combination determined.

2. The process of claim 1, wherein using the utility and cost indicators comprises finding the combination of the layer portions that provides the greatest overall benefit as measured by the sum of the utility indicators associated with the combination while having an overall transmission cost as measured by the sum of the cost indicators associated with the combination which is less than a prescribed cost constraint.

3. The process of claim 2, wherein the layered data is hierarchical in that it comprises at least one base layer each of which contains just enough data to provide a least acceptable benefit to the receiver and succeeding layers each of which contains unique data that enhances the benefit to the receiver and which are dependent on at least one of the immediately preceding layers, wherein said dependency dictates that the added benefit afforded by a succeeding layer cannot be realized by the receiver unless each preceding layer in a chain of dependency back to the base layer is received by the receiver, and wherein the process action of finding which combination of layer portions provides the greatest overall benefit to the receiver for each set of corresponding data layer portions comprises an action of considering only those combinations, referred to as legal combinations, which when including a layer portion from one of said successive enhancement layers also includes corresponding layer portions from each preceding layer in the chain of dependency associated with said included enhancement layer back to and including the base layer.

4. The process of claim 3 wherein the process action of determining which combination of layer portions provides the greatest overall benefit to the receiver for each set of corresponding data layer portions, further comprises the actions of:

identifying all the possible legal combinations associated with each set of corresponding data layer portions;

computing the overall benefit for each identified legal combination by adding the utility indicators assigned to each layer portion in the combination;

computing the total transmission cost for each identified legal combination by adding the cost indicators assigned to each layer portion in the combination; and for each set of corresponding layer portions, selecting the identified combination thereof that has the largest sum of utility indicators but has a total sum of cost indicators that is below the prescribed cost constraint.

5. The process of claim 4, wherein there are a plurality of transmission options that can be employed in transmitting a data layer portion from the sender to the receiver, and wherein the process action of identifying all the possible legal combinations associated with each set of corresponding data layer portions comprises an action of identifying all the possible legal combinations of the layer portions making up the set of corresponding data layer portions at each of the plurality of transmission options.

6. The process of claim 3, wherein the process action of finding which combination of layer portions provides the greatest overall benefit to the receiver for each set of corresponding data portions, further comprises the actions of:

starting with an empty set of layer portions;

adding layer portions starting with base layers to the set one layer portion at a time, choosing each subsequent layer portion to be added from among those that depend directly on a layer portion in the set; and choosing the layer portion for transmission as it is added such that the sum of the utility indicators divided by the sum of the cost indicators is maximized.

7. The process of claim 3, wherein the process action of finding which combination of layer portions provides the greatest overall benefit to the receiver for each set of corresponding data layer portions, further comprises the actions of:

starting with a set of all possible data layer portions;

deleting data layer portions one data layer portion at a time, choosing the data layer portion to be deleted that has no directly dependent data layer portions in the set; and selecting the data layer portion for transmission such that the sum of the utility indicators divided by the sum of the cost indicators is minimized.

8. The process of claim 3, wherein the process action of determining which combination of layer portions provides the greatest overall benefit to the receiver for each set of corresponding data layer portions, further comprises the actions of:

identifying all the possible legal combinations associated with each set of corresponding data layer portions;

for each possible legal combination, identifying all the possible results of transmitting the combination from the sender to the receiver considering that one or more of the data layer portions making up the combination may be lost or delayed during transmission and not arrive at the receiver before the time it is needed, computing the probability that each possible result will occur, respectively summing the utility indicators assigned to each layer portion associated with each identified result, for each identified result, multiplying the computed probability that the result will occur by the summed utility indicators associated with that result to produce an intermediate utility component, summing the intermediate utility components associated with each of the computed results to produce an expected utility;

computing the total transmission cost for each identified legal combination by adding the cost indicators assigned to each layer portion in the combination; and for each set of corresponding data layer portions, selecting the identified combination thereof that has the largest expected utility that is below the prescribed cost constraint.

9. The process of claim 8, wherein there are a plurality of transmission options that can be employed in transmitting a data layer portion from the sender to the receiver, and wherein the process action of identifying all the possible legal combinations associated with each set of corresponding data layer portions comprises an action of identifying all the possible legal combinations of the layer portions making up the set of corresponding data layer portions at each of the plurality of transmission options.

10. The process of claim 1, wherein the network is a packet-based network, and wherein the process action of segmenting the data layers comprises an action of segmenting each layer into its individual packets.

11. The process of claim 1, wherein the utility indicators assigned to each layer portion are a measure of the decrease in distortion provided to the receiver by the layer portion.

12. The process of claim 1, wherein the prescribed cost constraint is the maximum bandwidth associated with the network that is expected to be available at the time a set of corresponding layer portions is to be transmitted from the sender to the receiver and wherein the cost indicators assigned to each layered portion are a measure of the number of bits.

13. A computer-implemented process for transmitting layered data from a sender to a receiver over a network comprising the process actions of:

tagging each layer of the data to be sent with a utility indicator and a cost indicator, said utility indicator representing the utility of the data to the receiver and the cost indicator representing the transmission cost of sending the layer from the sender to the receiver; and determining which combination of data layers to be transmitted provides the greatest overall total utility that can be realized within a given cost constraint.

14. The process of claim 13 wherein the cost constraint is the maximum bandwidth associated with the network expected to be available at the time the layered data is sent, and wherein the transmission cost is the number of bits associated with the data.

15. The process of claim 13 wherein the utility is reduced distortion due to the receipt of the tagged data at the receiver.

16. The process of claim 13, wherein there are a plurality of transmission options that can be employed in transmitting a data layering portion from the sender to the receiver, and wherein the process action of using the utility and cost indicators to determine which combination of layer portions to transmit comprises the actions of:

letting $\pi=(\pi_1, \ldots, \pi_N)$ be the vector of transmission options where N represents the total number of data layer portions which hereinafter will be referred to as nodes; and maximizing the expected utility expected utility $U(\pi)=\Sigma_n \Delta U_n \Pi_{n'<=n}(1-\epsilon(\pi_{n'}))$, subject to a constraint on the cost $C(\pi)=\Sigma_n \Delta C_n \rho(\pi_n)$ wherein $\Delta U_n$ is the utility indicator associated with the nth node, the product $\Pi_{n'<=n}$ is over all nodes n' on which node n depends, including itself, where the notation n'<=n means that n' is an ancestor of n in the chain of dependency, $\epsilon(\pi_{n'})$ is the probability that an ancestor node n' of the node n under consideration will not arrive on time at the receiver, $\Delta C_n$ is the cost indicator associated with the nth node, and $\rho(\pi_n)$ is the cost associated with transmission option under consideration.

17. The process of claim 16, wherein the process action of maximizing the expected utility subject to the cost constraint comprises the actions of:

restricting the maximizing process action to points on an upper convex hull of a plane defined by the set of all cost utility points $\{(C(\pi),U(\pi))\}$ where the vector $\pi$ takes on all possible combinations of transmission options; and finding the transmission option vector $\pi$ that maximizes a Lagrangian $J_\lambda(\pi)$ defined by $\Sigma_n[\Delta U_n \Pi_{n'<=n}(1-\epsilon(\pi_{n'}))-\lambda\Delta C_n\rho(\pi_n)]$ where $\lambda$ is a Lagrange multiplier greater than zero.

18. The process of claim 17, wherein the process action of finding the $\pi$ that maximizes the Lagrangian $J_\lambda(\pi)$ comprises an action of employing an alternating variables for multivariate minimization technique such that $J_\lambda(\pi_1, \ldots, \pi_N)$ is maximized one variable at a time, keeping the other variables constant, until convergence.

19. The process of claim 18, wherein the process action of employing an alternating variables for multivariate minimization technique comprises the actions of:

letting $\pi^{(0)}$ be any initial transmission option vector;

letting $\pi^{(t)}=(\pi_1^{(t)},\ldots,\pi_N^{(t)})$ be determined for $t=1, 2, \ldots$;

selecting one component $n^{(t)}$ in $\{1, \ldots, N\}$ to optimize at step t via a round-robin technique $n^{(t)}=t$ mod N;

for $n \neq n^{(t)}$, letting letting $\pi_n^{(t)}=\mathrm{argmax}_{\pi}J_\lambda(\pi_1^{(t)}, \ldots, \pi_{n-1}^{(t)},\pi, \pi_{n+1}^{(t)}, \ldots, \pi_N^{(t)})=\mathrm{argmin}_\pi S_n^{(t)}\epsilon(\pi)+\lambda\Delta C_n\rho(\pi)=\mathrm{argmin}_\pi \epsilon(\pi)+\lambda'\rho(\pi)=$ wherein $S_n^{(t)}=\Sigma_{n'>=n}\Delta U \Pi_{n''<=n', n''\neq n}(1-\epsilon(\pi_{n''}^{(t)}))$, and $\lambda'=\lambda\Delta C_n/S_n^{(t)}$.

20. The process of claim 19, wherein the minimization of $\epsilon(\pi)+\lambda'\rho(\pi)$ can be performed by an exhaustive search technique.

21. A computer-readable medium having computer-executable instructions for determining the optimum data packet combination to be transmitted from a sender to a receiver, said computer executable instructions comprising:

tagging data with an end-user's utility in receiving the data stream;

tagging said data with a cost for transmission and utility of receipt; and maximizing overall end-user utility by selecting the appropriate set of streams for transmission by selecting a set of data streams whose total cost is below a given constraint but which maximizes the total utility to the end-user.

22. A system for processing data, the system comprising:

a general purpose computing device; and a computer program comprising program modules executable by the computing device, wherein the computing device is directed by the program modules of the computer program to, segment the data into corresponding portions;

tagging each data portion with a utility indicator representative of the benefit afforded by processing that portion;

tagging each portion of data with a cost indicator representative of cost to process the data;

for each set of corresponding data portions, determining which combination of the portions provides the greatest overall benefit as measured by the sum of the utility indicators associated with the combination while having an overall cost as measured by the sum of the cost indicators associated with the combination which is less than a prescribed cost constraint; and processing the combination determined to provide the greatest overall benefit for each set of corresponding data layer portions.

23. A computer-implemented process for determining which data to transmit from a sender to a receiver comprising the process actions of:

segmenting the data into corresponding portions;

tagging each portion of data with a utility indicator representative of the benefit afforded the receiver by the receipt of that portion;

tagging each portion of data with a cost indicator representative of cost to transmit the portion from the sender to the receiver; and for each set of corresponding data portions, using the utility and cost indicators to determine which combination of the portions to transmit.

24. The computer-implemented process of claim 23 further comprising the process action of:

transmitting the determined combination of data portions.

* * * * *